United States Patent [19]
Whittaker, Jr.

[11] 4,147,088
[45] Apr. 3, 1979

[54] DRILL SCREW

[75] Inventor: Charles B. Whittaker, Jr., Statesville, N.C.

[73] Assignee: NL Industries, Inc., Hightstown, N.J.

[21] Appl. No.: 778,149

[22] Filed: Mar. 16, 1977

[51] Int. Cl.² ............................................. F16B 25/00
[52] U.S. Cl. ....................................... 85/41; 10/10 R; 76/101 B; 72/476
[58] Field of Search ................... 85/41, 47; 408/228, 408/229, 227; 10/10 R

[56] References Cited
U.S. PATENT DOCUMENTS

| | | |
|---|---|---|
| 3,288,015 | 11/1966 | Hanneman ............................ 85/47 |
| 3,395,603 | 8/1968 | Skierski ................................. 85/47 |
| 3,463,045 | 8/1969 | Prescott ................................ 85/41 |
| 3,517,581 | 6/1970 | Stokes et al. ........................ 85/47 |
| 3,682,038 | 8/1972 | Lejdegard ............................. 85/41 |
| 4,016,795 | 4/1977 | Gill ....................................... 85/41 |

*Primary Examiner*—Ramon S. Britts
*Attorney, Agent, or Firm*—Fitzpatrick, Cella, Harper & Scinto

[57] ABSTRACT

A drill screw comprising a threaded fastener with a drill bit formed on its entering end, the drill bit characterized by a bi-arc cross-section, that is the shape which is shared by two partially overlapping circles. Also disclosed are novel pinch point dies for making the drill bits and novel hobs for making the pinch point dies.

10 Claims, 30 Drawing Figures

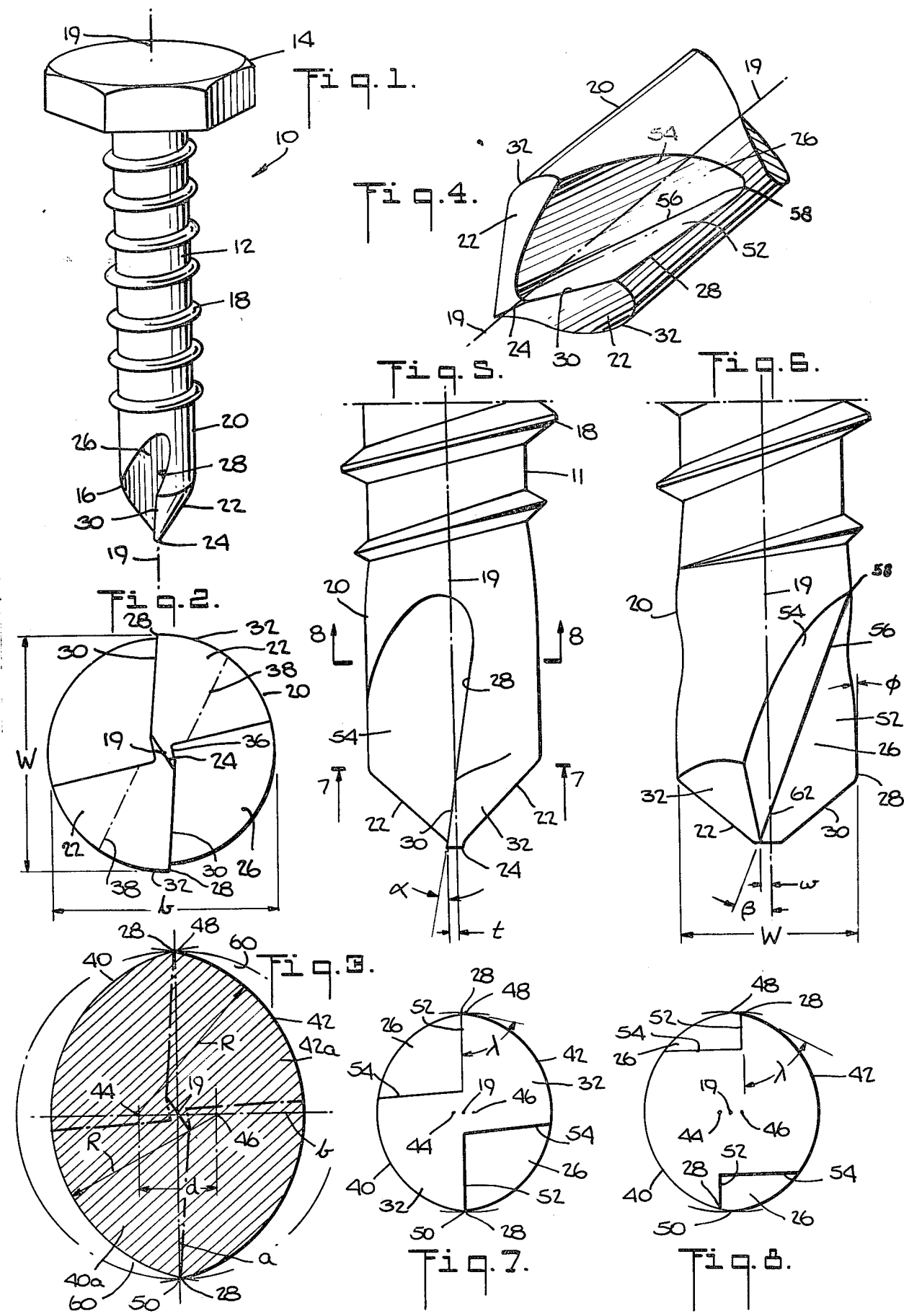

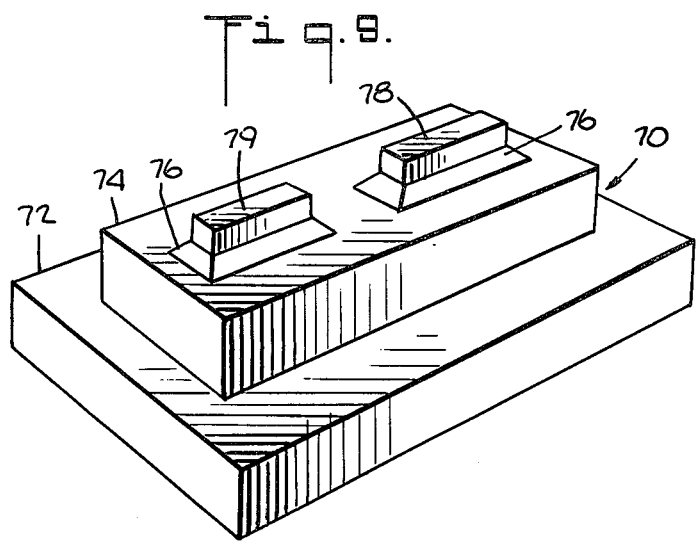
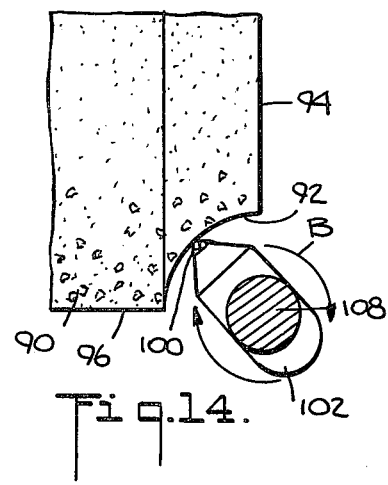
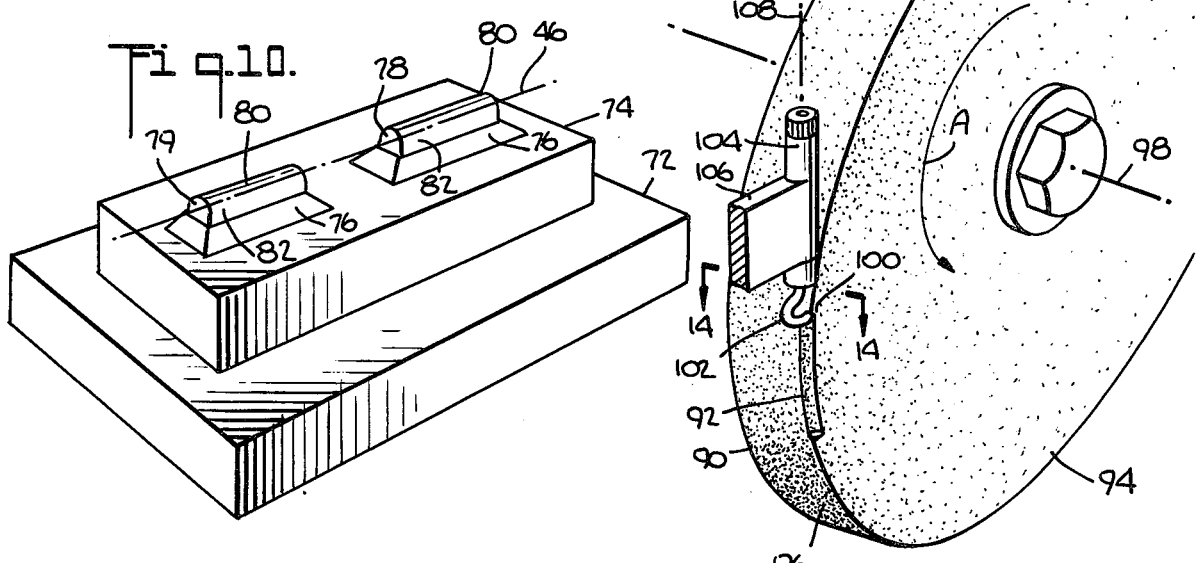
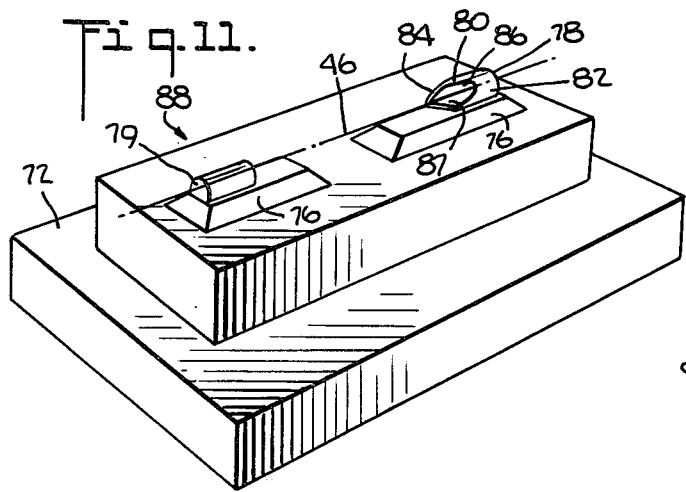
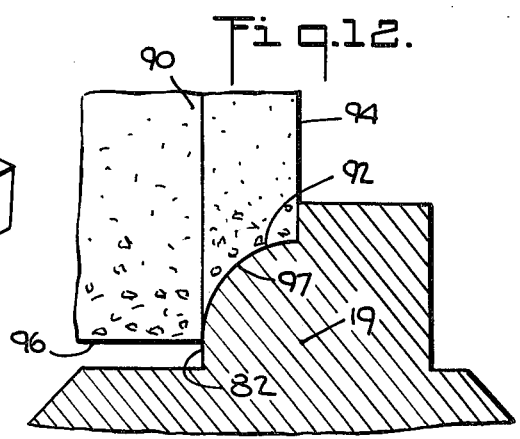

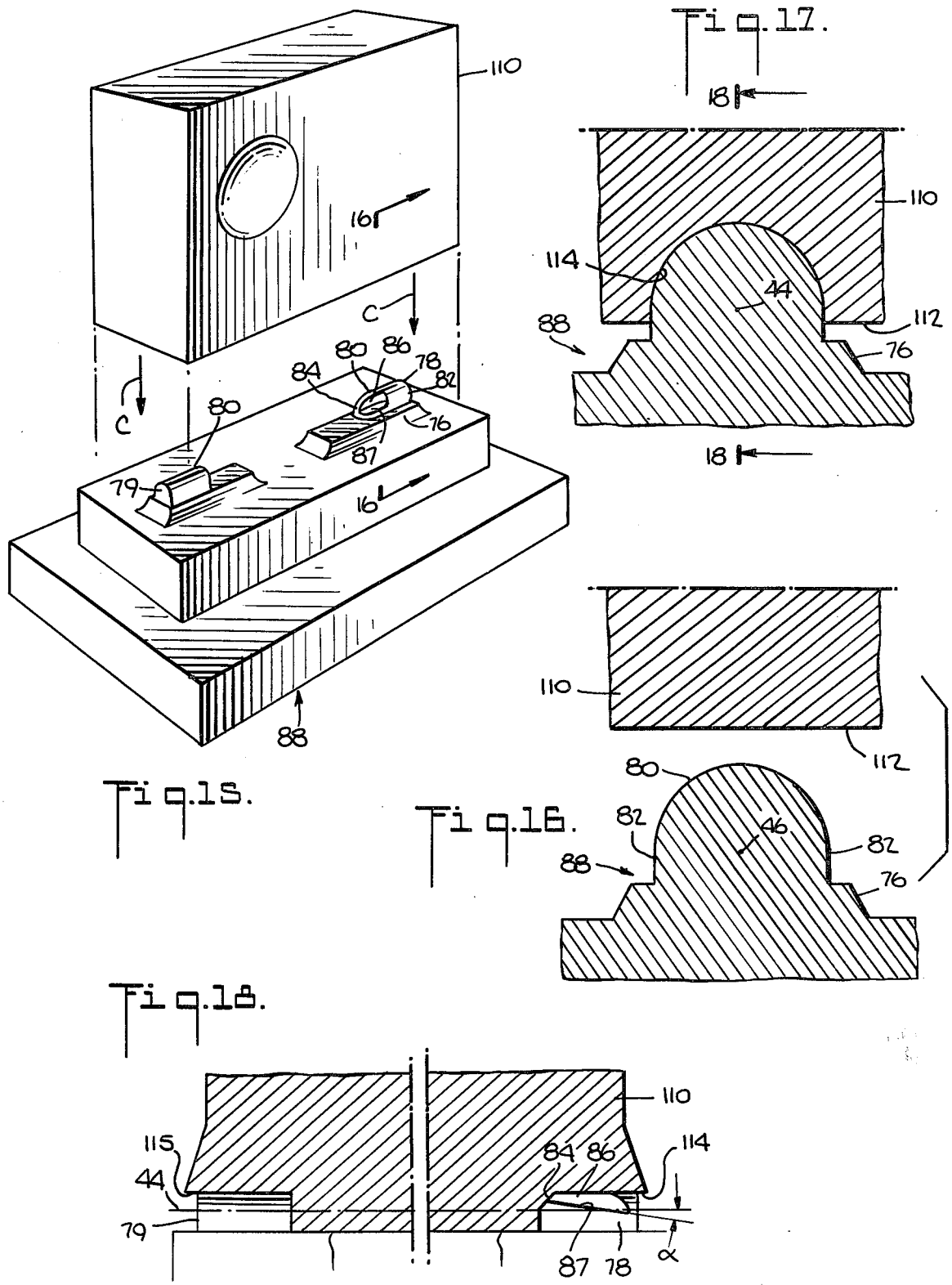

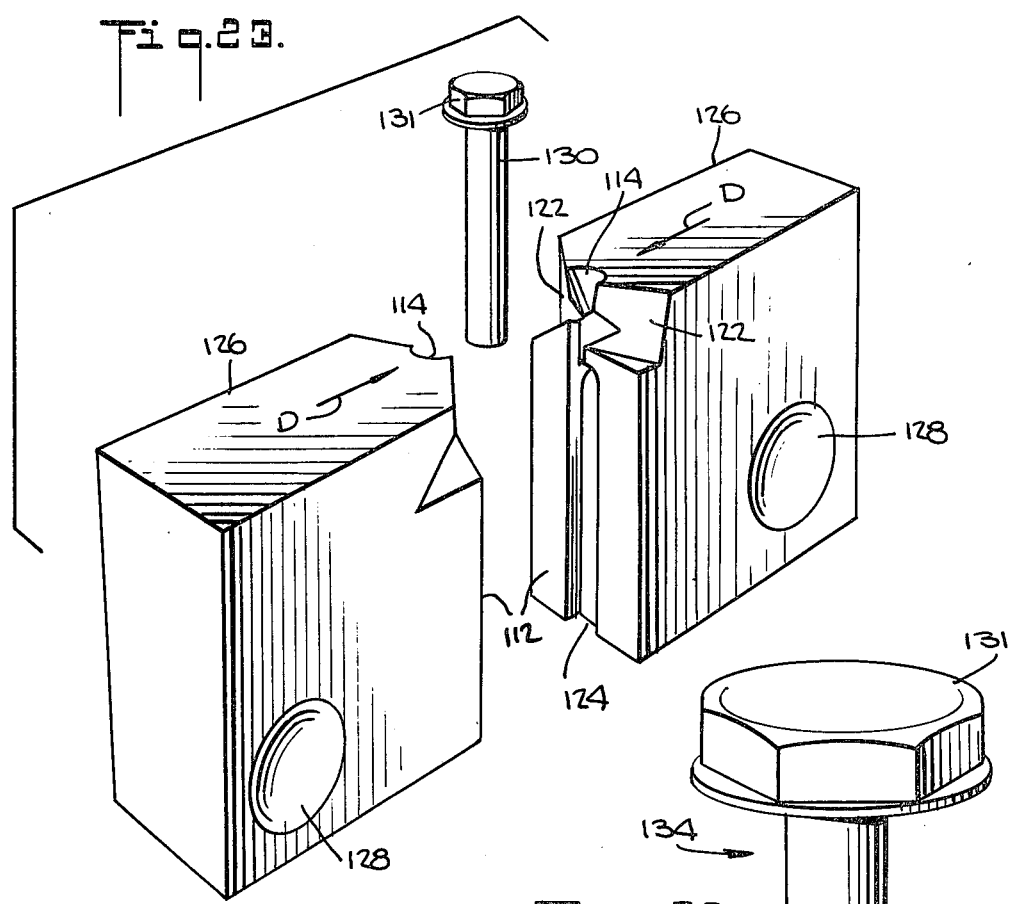
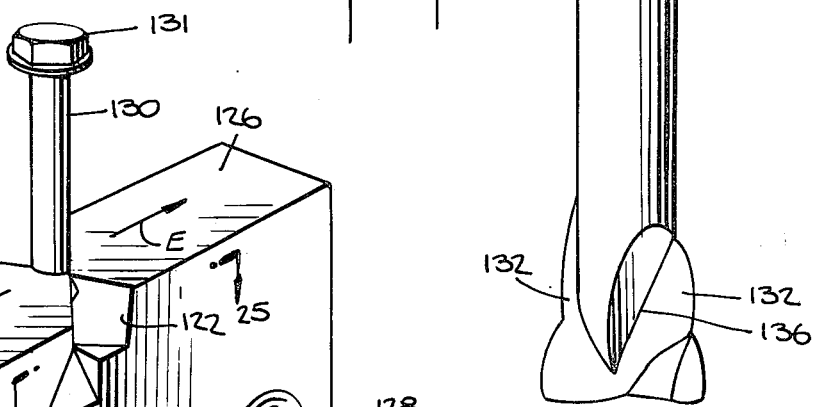
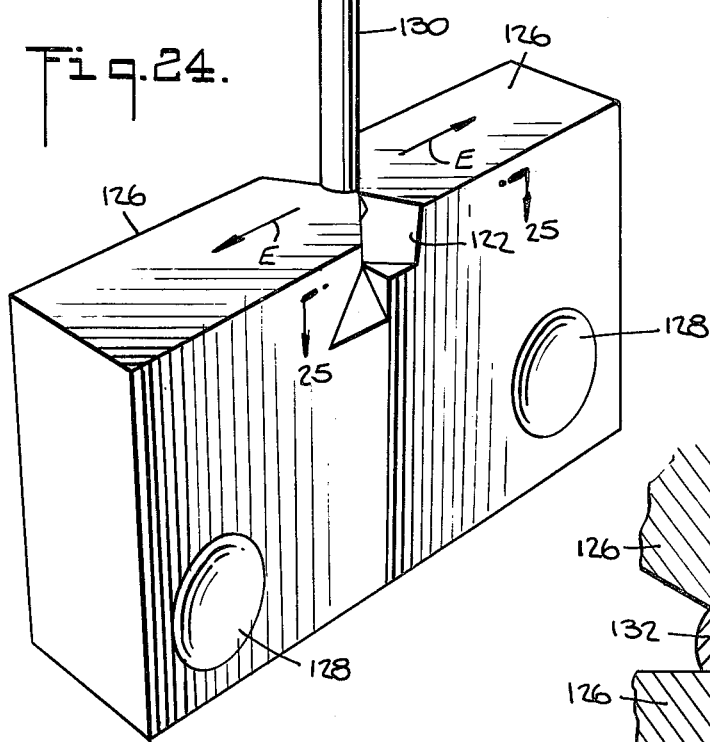
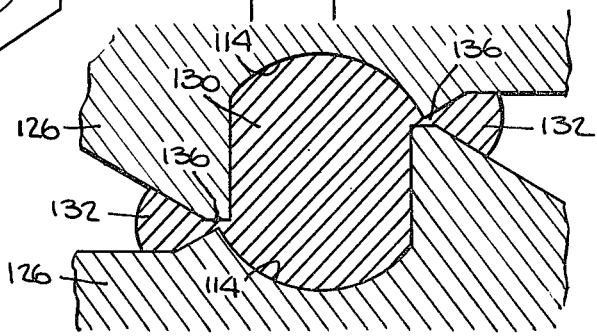

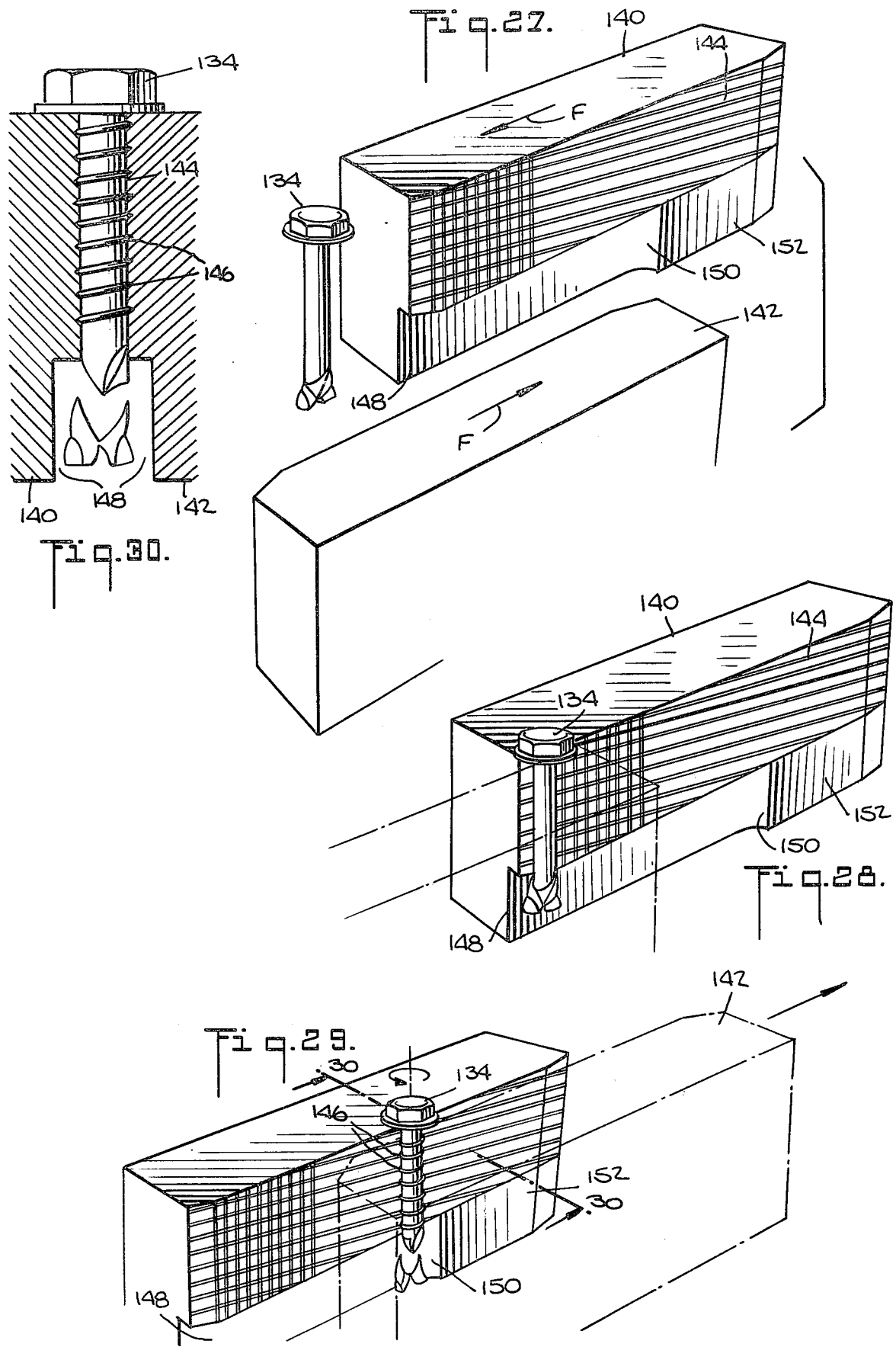

ID SCREW

FIELD OF THE INVENTION

The invention relates to screw fasteners. More particularly, the invention concerns a novel drill screw and methods and apparatus for manufacturing same.

BACKGROUND OF THE INVENTION

Description of the Prior Art

U.S. Pat. No. 3,395,603 to E. J. Skierski discloses a drill screw of the type over which the present invention provides improvements. The Skierski drill screw comprises an elongated element having a driving head at one end, a threaded central region and a drill bit formed at the opposite end. The drill bit is formed with flutes extending therealong in diagonally opposed quadrants with one surface of each flute cooperating with the peripheral surface of the drill bit and tapered point portions of the drill bit to form cutting edges. The outer periphery of the shank portion of the drill bit is elliptical in cross-section and the surfaces of the flutes which define the cutting edges intersect the outer periphery of the drill bit shank portion at the major axis of the ellipse. The purpose for this is to provide cutting edges at locations farthest away from the central axis of the screw and to provide a peripheral relief behind each cutting edge.

The above identified Skierski patent also shows a pair of point forming dies which close upon each other and pinch the end of a screw blank between them. The dies have identations on their mutually facing working surfaces which conform to the shape of the drill bit to be formed on the end of the screw. When the dies close on each other they pinch the metal of the screw blank and cause it to flow into and conform to the shape of the identations. The Skierski patent does not describe how the die identations are formed; but in any event curved surfaces of the die must describe elliptical segments so that the drill bit which they provide will have the elliptical cross-section required by the Skierski patent.

There are certain disadvantages which result from the elliptical cross-section employed by Skierski to obtain peripheral relief behind each drill bit cutting edge. Firstly, the plane of the outer periphery of the drill bit is always perpendicular to the direction of movement of the cutting edge so that relief is not provided immediately behind the cutting edge. Secondly, because the plane of the outer periphery of the drill bit is perpendicular to the direction of movement of the cutting edge, the angle between the peripheral plane and the intersecting flute plane along the cutting edge is never less than 90° so that the sharpness of the cutting edge is limited. Finally, the elliptical cross-section described by Skierski is quite difficult to obtain in a mass production operation. This is because the dies which are used to form the screw drill points must be indented to the elliptical cross-sectional shape, and the techniques for accomplishing this, i.e., electrical discharge machining and hobbing, are difficult and expensive. Electrical discharge machining is not adaptable to the high production rates needed for commercial die manufacture. Although hobbing is adaptable to commercial production, it is very difficult, time-consuming and expensive to grind hobs to an elliptical contour because the grinding wheel used to shape the hob must itself be dressed to an elliptical contour; and the dressing stone which shapes the grinding wheel must be moved synchronously about two axes during the dressing operation.

SUMMARY OF THE INVENTION

According to one aspect of the present invention, there is provided a novel drill screw having a cross-sectional configuration which minimizes drag and provides relief immediately behind the drill bit cutting edges. Moreover, the novel drill screw of the present invention provides drill bit cutting edges which are sharper than those of the prior art.

The novel drill screw of the present invention is characterized by a fluted drill bit shank and flank having an outer peripheral surface at each cross-section of the flute which intersects a line, directed from the screw axis to the cutting edge, at an acute angle. This structural configuration of the drill screw of the invention assures that the peripheral surface of the drill shank and flank falls back from the surface of the hole being drilled beginning at a point immediately behind the drill bit cutting edge so that, in use, friction is minimized. Also, the aforementioned acute angle (i.e., between the peripheral surface of the drill shank and flank at the cutting edge and a line from the cutting edge to the screw axis) provides a cutting edge which is sharper than can be obtained with a shank of elliptical cross-section. In a preferred embodiment, the peripheral surface of the drill shank at each land formed between adjacent flutes is in the shape of a segment of a cylinder whose axis is parallel to the screw axis and lies in a plane perpendicular to the plane which includes the screw axis and the drill bit cutting edge. In other words, the drill shank cross-section of the preferred embodiment is developed from the common or shared region of two partially intersecting or overlapping circles.

In another of its aspects, the present invention provides a novel method for manufacturing a drill screw. This method includes the steps of squeezing one end of the shank portion of a drill screw blank having a head of suitable construction integrally connected at its other end between a pair of dies having specially shaped indentations, i.e. characterized by curved surfaces corresponding to cylindrical segments whose axes are outside the respective dies, to form a drill point of bi-arc configuration; and then threading the central region of the shank portion of the screw blank, and thereafter hardening the resulting drill screw.

The present invention also involves the provision of a novel pinch point die construction comprising a pair of die elements each having an indentation formed in the shape of one half of a drill bit. Thus, each die indentation has a drill bit shank forming region, a tapered drill bit flank forming region and a flute forming projection which extends into the shank and flank forming regions. The shank forming region is characterized by a cylindrical inner surface whose cylindrical axis lies outside the die itself. These novel pinch point dies come together to develop a drill point having a bi-arc configuration.

The pinch point dies are manufactured, according to the present invention, by impressing into a die block an indentation corresponding in shape to one-half of a drill bit of circular cross-section. That is, the indentation includes a shank region in the form of a cylindrical segment, a tapered flank region and a flute forming portion extending into the shank and flank regions. After the indentation has been impressed into the die block the surface of the block adjacent the indentation is ground back to a degree such that the axis of the cylindrical segment is located a finite distance outside the die block. Thus, while semi-cylindrical surfaces are impressed into two such die blocks, they are easily made capable of pinch forming a bi-arc drill point configuration simply by grinding back their surfaces adjacent the indentations.

The present invention also involves the provision of a novel hob for forming indentations in a pinch point die block. The novel hob is characterized by a projection on a horizontal surface, the projection being formed in the shape of a semi-cylinder with a tapered portion at one end adjacent the semi-cylinder and a flute shaped indentation extending along the tapered portion and the semi-cylinder. The flute shaped indentation itself has a horizontal surface which is displaced up from the semi-cylinder axis. This enables the hob to form a pinching die indentation which, when the surrounding die surface is ground back, will serve to pinch a bi-arc shaped drill bit with a drill flute cutting surface located at a desired position and orientation with respect to the bi-arc intersection. Thus the hob of the present invention makes possible the formation of a bi-arc drill bit having flute cutting surfaces at desired rake angles and arranged to pass through the bi-arc intersection where the shank and flank portions of the drill bit meet each other.

According to the present invention, the novel hob is formed by first dressing a grinding wheel by swinging a stone about an axis perpendicular to the grinding wheel axis to form a groove which, in radial section, conforms to an arc of a circle and thereafter passing the wheel over an elongated projection to form the upper surface of the projection into a semi-cylinder. One end of the upper surface of the projection is ground to a taper and then a flute shaped indentation is ground into the tapered and semi-cylindrical portion.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which the invention is based may readily be utilized as the basis for the design of other arrangements for carrying out the purposes of this invention. It is important, therefore, that the disclosure of this specification be regarded as including such equivalent arrangements as do not depart from the spirit and scope of the invention.

BRIEF DESCRIPTION OF THE DRAWINGS

Several embodiments of the invention have been chosen for purposes of illustration and description in the accompanying drawings which form a part of the specification and wherein:

FIG. 1 is a perspective view of a drill screw of the present invention;

FIG. 2 is an enlarged entering end view of the drill screw of FIG. 1;

FIG. 3 is a diagrammatic cross-sectional view similar to FIG. 2 but exaggerated to illustrate the development of the outer contours of the entering end portion of the drill screw;

FIG. 4 is a fragmentary perspective view showing a drill bit portion at the entering end of the drill screw of FIG. 1;

FIG. 5 is a fragmentary elevational view of the drill bit portion of the drill screw of FIG. 1;

FIG. 6 is a view similar to FIG. 5 but showing the drill bit portion rotated about its longitudinal axis by 90°;

FIG. 7 is a cross-sectional view taken along line 7—7 of FIG. 5;

FIG. 8 is a cross-sectional view taken along line 8—8 of FIG. 5;

FIG. 9 is a perspective view of a blank from which a hob is formed, which hob is used in the manufacture of pinch pointing dies used in forming the entering end portion of the drill screw of FIG. 1;

FIG. 10 is a view similar to FIG. 9 and shows the hob blank in partially finished condition;

FIG. 11 is a perspective view of the finished hob formed from the blank shown in FIGS. 9 and 10;

FIG. 12 is an enlarged fragmentary view showing, in section, a grinding wheel forming a semi-cylindrical curvature on the hob blank of FIG. 9;

FIG. 13 is a fragmentary perspective view of the grinding wheel of FIG. 12 along with a grinding wheel dressing device used to dress the wheel to a curvature for grinding a semi-cylindrical curvature on the hob blank of FIG. 9;

FIG. 14 is an enlarged fragmentary view taken along line 14—14 of FIG. 13;

FIG. 15 is a perspective view showing the position of a pinch pointing die blank to be hobbed by the hob shown in FIG. 11;

FIG. 16 is an enlarged fragmentary sectional view taken along line 16—16 of FIG. 15;

FIG. 17 is a view similar to FIG. 16 but showing the completion of a hobbing operation, i.e. with the die blank fully pressed down upon the hob;

FIG. 18 is a further fragmentary section view taken along line 18—18 of FIG. 17;

FIG. 23 is an exploded perspective view showing the positioning of a drill screw blank between a pair of pinch pointing dies according to the present invention;

FIG. 24 is a view similar to FIG. 23 but showing the dies closed upon the drill screw blank;

FIG. 25 is an enlarged section view taken along line 25—25 of FIG. 24;

FIG. 26 is an enlarged perspective view showing a drill screw blank with a drill bit formed thereon by the pinch pointing dies of FIG. 24;

FIG. 27 is an exploded perspective view showing the drill screw blank of FIG. 26 in conjunction with a pair of thread roll dies;

FIG. 28 is a view similar to FIG. 27 but showing the drill screw blank positioned at the entering ends of the thread roll dies at the beginning of a thread rolling operation;

FIG. 29 is a view similar to FIG. 28 but showing the drill screw blank at a further stage of its thread rolling operation; and FIG. 30 is an enlarged section view taken along line 30—30 of FIG. 29.

DETAILED DESCRIPTION OF THE PREFERRED EMBODIMENTS

Figure 20:
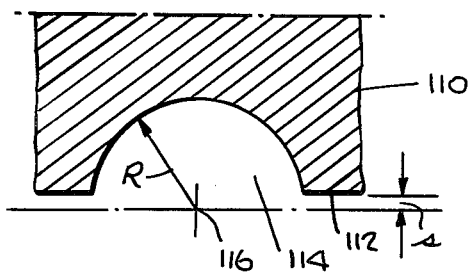
FIG. 20 is a view similar to FIG. 19 but showing the results of a grinding operation performed subsequent to hobbing.

As shown in FIG. 1, a drill screw 10 according to the present invention comprises an elongated cylindrical member 12 having a driving head 14 at one end and a drill bit 16 at the opposite end. The central portion of the drill screw 10 is threaded as at 18. The driving head 14, which is preferably integral with the cylindrical member 12, is adapted to be engaged by a driving tool to turn the screw while forcing it axially into a workpiece. As shown, the driving head 14 is of the well-known hex-head type. Other well known driving head configurations may also be employed, e.g. slotted, recessed hexagonal, etc. The screw threads 18 may be of any desired configuration, e.g., conventional American or metric thread, and towards the entering end of the screw, i.e., nearest the drill bit 16, threads 18 diminish in height and blend into the shank of the screw.

The driving head 14, the threaded central region 18 and the drill bit 16 all extend along a common longitudinal axis 19.

The drill bit 16 is integrally formed at the end of the cylindrical member 12. As shown, the drill bit 16 has a shank portion 20 which extends between threads 18 and an inwardly tapered flank or point portion 22 that projects downwardly from the shank portion and terminates at a chisel edge tip 24. Flutes 26 are impressed into the flank and shank portions 22 and 20 of the drill bit and the flutes extend longitudinally of the screw and form shank and flank cutting edges 28 and 30.

In operation, the drill screw 10 is positioned with the chisel edge tip 24 pressed against a workpiece (not shown), which may be two pieces of sheet material to be fastened together. A driving tool (not shown), such as an electric or pneumatic screw driver, is fitted to the driving head 14 and upon operation both rotates and presses the drill screw 10 axially against the workpiece. The chisel edge tip 24 forms an initial indentation into the workpiece and then the flank cutting edges 30 engage the workpiece material and begin to cut a hole into the workpiece. The hole formed in the workpiece is reamed to size by the shank cutting edges 28 which are dimensioned to produce a hole in the workpiece that is larger than the minor diameter of threads 18 but smaller than the major diameter of the threads.

After drilling the hole in the workpiece, the turning of drill screw 10 is continued so that the portion of threads 18 having the smallest diameter first engage the hole and swage the inner surface thereof to reshape the surrounding metal by a cold-forming operation into the shape of mating threads. The drill screw 10 is then further driven axially into the now threaded hole until it tightly engages the workpiece. The workpiece may comprise two pieces of superimposed sheet material in which case the drill screw 10 will become threadedly engaged to both workpieces and will hold them tightly together.

FIGS. 2-8 each shows details of the drill bit 16 of the drill screw. As can be seen in the end view of FIG. 2, the flutes 26 extend into the drill bit 16 in diagonally opposed quadrants and divide the drill bit 16 to provide lands 32 which lie in the remaining diagonally opposed quadrants. Each flute 26 extends into the flank portion 22 (in the horizontal direction as shown in FIG. 2) and stops close to the central longitudinal axis 19 of the drill screw. However, each flute 26 extends in the vertical direction (as shown in FIG. 2) beyond the axis 19. This flute arrangement provides a central web at the screw tip. The flank portions 22 that provide opposed lands 32 intersect each other in the web 36 to provide the chisel edge tip 24 that extends diagonally of the web generally in the direction towards the opposed flutes 26. In order to provide adequate relief behind the flank cutting edges 30, the peripheral surface of the flank portion 22 in the region between the flank cutting edge 30 and phantom line 38 is substantially flat. The phantom lines 38, as shown, extend from the far corner of the chisel edge tip in a manner generally parallel to a hypothetical radial line from longitudinal axis 19 along the flank portion 22. The region of the flank portion behind each phantom line 38 is shaped to blend smoothly into the adjoining shank portion 20. This arrangement provides a relief surface behind each flank cutting edge 30 to minimize friction during drilling.

As can be seen in FIG. 2, the periphery of the shank portion 20, including the peripheral portion of the lands 32, is curved. However, the curvature is not continuous. Instead, it is a composite configuration referred to hereinafter as a "bi-arc" cross-section. The development of this bi-arc cross-section is illustrated in the enlarged and exaggerated diagrammatic view of FIG. 3, which represents a typical cross-section along the shank portion 20 of the drill screw, without the flutes 26. As shown in FIG. 3, the bi-arc is the region formed by two partially overlapped cylinders 40 and 42 each of radius R. That is, the shank periphery is made up of two mating cylindrical segments 40a and 42a. These cylindrical segments have axes of curvature 44 and 46 which are parallel to the screw axis 19 but are displaced from each other on opposite sides of the screw axis by a distance d. The common or bi-arc region (shown shaded in FIG. 3), has a longer or major cross-sectional axis a, which coincides with intersection lines 48 and 50 of the two cylinders, and a shorter or minor cross-sectional axis b, which is perpendicular to the major cross-sectional axis. It will be seen that the axes or centers of curvature 44 and 46 of the cylinders 40 and 42 intersect the minor cross-sectional axis b and are equidistant from the major cross-sectional axis a. The major and minor cross-sectional axes a and b intersect each other at the common longitudinal axis 19 of the drill screw. It will be seen from the foregoing that the axes of curvature 44 and 46 depicted in FIG. 3 lie in the same horizontal plane as the common longitudinal axis 19 and all three axes are parallel to each other. This same horizontal plane, moreover, is perpendicular to a plane extending from the common longitudinal axis 19 to the intersection lines 48 and 50.

Turning now to FIG. 4, it will be seen that each flute 26 is defined by a cutting surface 52 and a drag surface 54 which extend inwardly from the peripheral surfaces of the shank and flank portions 20 and 22 and which come together along a line 56. The cutting and drag surfaces serve also to define the diagonally opposed lands 32 interposed between the flutes. The flutes 26 are deepest at the point end of the drill bit 16 where they overlap to define the central web 36. As the flutes extend back along the shank portion 20 they become shallower until they merge with the shank surface at a location 58 along the shank periphery. It will be noted that each flute cutting surface 52 intersects the flank and shank surfaces of the adjacent land 32 along the shank and flank cutting edges 28 and 30. These cutting edges extend generally along the intersection lines 48 and 50 of the cylindrical segments 40a and 42a depicted in FIG. 3. The flute drag surfaces 54, on the other hand, intersect the shank periphery near the minor cross-sectional axis b shown in FIG. 3. Thus, it will be seen that the cutting edges 28 and 30 at each cross-section are located at the outermost radial extent from the screw axis 19. Also because of the bi-arc configuration, the outer periphery of the drill bit cross-section curves back behind the cutting edge to provide a relief 60, as shown in FIG. 3, so that minimal friction will be encountered between the shank portion 20 and the surface of the hole which it forms in a workpiece.

It will be seen in FIG. 5 that the cutting surface 52 of each flute 26 extends at a slight angle $\alpha$ to the screw axis 19. The angle $\alpha$, which is referred to as the rake angle, is employed to provide sharpness to the flank cutting edge 30. In the presently preferred embodiments a rake angle $\alpha$ of about nine degrees is employed, although other rake angles may be chosen; and, in fact, in some instances a varying rake angle may be employed to define a spirally shaped flute. Because of the rake angle $\alpha$ the flute cutting surface 52 at the tip of the screw is displaced a distance t from the axis 19 to define one half the thickness of the web 36. The surface 52 intersects the shank and flank portions 20 and 22 at the point where the latter both meet.

As shown in FIG. 6, the flute drag surface 54 also extends back from the tip of the screw at an angle $\beta$ with respect to the axis 19. The drag surface is displaced a distance w from the axis 19 to define one half the width of the web 36; and it crosses over the axis at a location 62 in the flank portion 22 of the screw.

It will also be noted in FIG. 6 that the intersection of the flank and shank cutting edges 30 and 28 defines the greatest diameter of the drill bit 16 and that the drill bit has a slight back taper in the plane of the cutting surface 52 extending back along the shank 20. This back taper occurs because the flute cutting surface 52 intersects the major axis a of the bi-arc configuration (FIG. 3) only where the flank and shank cutting edges 30 and 28 meet each other. As can be seen in FIG. 5, the flute cutting surface intersects the shank periphery at locations farther removed from the bi-arc major axis as it extends farther back from the screw tip.

As can be seen in FIG. 7, the flute cutting surface 52 extends along the major axis a of the bi-arc at the widest part of the drill bit. It will also be seen that the periphery of each land's shank and flank portion 20 and 22 intersects its associated flute cutting edge surface 52 at an acute angle $\lambda$, i.e. less than ninety degrees. This defines cutting edges 28 and 30 which are sharper than that obtained with a drill screw whose cross-section is circular or elliptical. In prior art drill screws the peripheral surface of each land intersected the radially extending flute cutting surface at ninety degrees so that the sharpness of the cutting edge was limited. With the present invention, however, the curvature of the land periphery is not centered at the screw axis but instead it is displaced therefrom along the minor axis b of the screw cross-section. As a result of the unique design feature of the drill screw of the present invention, the land periphery and the flute cutting surface thereof intersect to define an angle of less than ninety degrees.

It has also been found that the bi-arc configuration, the drill screw of the present invention achieves surface relief behind each cutting edge that is not possible with prior art drill screws having circular or elliptical cross-sections. In both the circular and elliptically cross-sectioned drill screws of the prior art, the land periphery is tangent to the circular surface being formed for a finite distance behind the cutting edge. Thus, in the prior art, in order to obtain a suitable back relief so as to minimize rubbing friction it was necessary to employ an elliptical cross-section having a large percentage difference, e.g. ten percent, between the respective lengths of the major and minor axes of the elliptical cross-section. On the other hand, because of the more effective back relief provided by the bi-arc configuration of the present invention, the percentage difference between the cross-sectional axes a and b is much smaller. A difference of from three to five percent has been found to be suitable, with four percent being preferred.

These major to minor axis ratios are most easily incorporated in the design of the drill screw of the present invention by selecting the distance d (FIG. 3) between the cylindrical axes 44 and 46 to be in the range of three to five, and preferably four, percent of the length of the major axis a and by choosing a radius R which extends from each cylindrical axis to one of the intersection lines 48 and 50.

As can be seen in FIG. 8, the flutes 26 are of less depth along the shank portion 20 than along the flank portion 22 of the drill screw. Also, as indicated above, because of the rank angle $\alpha$ the flute cutting surface 52 intersects the periphery of each land 32 farther away from the bi-arc intersection lines 48 and 50. As a result, the angle $\lambda$ increases back along the shank so that an even sharper cutting edge angle results. Because of this, any wearing of the cutting edges during drilling will result in the exposure of even sharper cutting edges to the surface of the hole being drilled.

The drill screw 10 is manufactured by cutting wire, e.g. mild steel, into suitable lengths which are slightly longer than the desired length of the finished screws. Each wire length is processed by conventional means in a header machine that reshapes the metal at one end of the wire by a cold-forming operation into the configuration of the driving head 14 to provide a drill screw blank. The opposite end of the drill screw blank is then pinch pointed according to the present invention to form the drill bit 16 after which the threads 18 are formed on the drill screw blank by a rolling operation.

The drill bit 16 is formed on the drill screw blank by squeezing the end of the blank between a pair of pinch pointing dies. The pinch pointing dies themselves are made by impressing a specially shaped hob into a die block to form an indentation, hardening the indented die block and then grinding relief surfaces on the block adjacent the indentation. The hob in turn is manufactured by grinding a hardened metal workpiece to the shape of the indentation to be formed in the die block.

FIG. 9 shows a hardened workpiece 70 from which a hob is to be formed. The workpiece 70 comprises a rectangular slab-like base 72 on which is mounted a similarly shaped, though smaller, platform 74. A pair of elongated but generally pyramidally shaped abutments 76 project up from the platform 74; and elongated rectangular projections 78 and 79 rest on top of each abutment. As can be seen in FIG. 9, the horizontal axis of each projection 78 and 79 extends in a direction parallel to the upper plane or surface of platform 74 and in alignment with each other.

Initially, the projections 78 and 79 have a generally rectangular cross-section. However, in forming the hob, the uppermost longitudinal corners of the projections 78 and 79 are ground away to form a rounded or semi-cylindrical contour 80 as shown in FIG. 10. The semi-cylindrical upper surface contours 80 of the projections 78 and 79 share a common axis which is also parallel to the surface of platform 74 and which coincides with the cylindrical axis 44 (FIG. 3). The projections 78 and 79 each have vertical sides 82 that are tangent to and extend downwardly from the semi-cylindrical contour 80.

After the semi-cylindrical upper surface contours 80 are formed on the upper surface of the projections 78 and 79, the ends of the projections are ground back somewhat as shown in FIG. 11. In addition, one of the projections, 78, is formed with a taper 84 at one end coinciding with a drill point end or flank taper. The taper 84 is characterized by a peripheral surface which is flat along its length over the major portion of the distance therearound from one side of the semi-cylinder. The projection 78 is also ground to form a flute shaped notch 86 corresponding to one of the flutes 26 of the drill screw 10 of FIG. 1. These various grinding operations serve to convert the original workpiece 70 of FIG. 9 into a completed hob 88 as shown in FIG. 11. The remaining portion of the peripheral surface of the taper 84, i.e. from the flat portion to the notch 86, is curved back so that it tangentially intersects the semi-cylindrical contour. The notch 86 has a flute cutting edge surface 87 which passes through a horizontal line perpendicular to the semi-cylinder axis. The flute cutting edge surface 87 is tilted slightly from the horizontal so that it is higher, as viewed in FIG. 11, in a direction toward the taper 84. This provides the rake angle α described above in connection with FIG. 5; and preferably it is about nine degrees. Also, in order to have the drill bit flute cutting edge surface intersect the bi-arc periphery at the bi-arc intersection lines 48 and 50 (FIG. 3), the surface 87 on the hob should be displaced by a finite distance up from the semi-cylinder axis, at least where the taper 84 begins. This finite distance is preferably in the range of three to five percent, and most preferably four percent, where the taper 84 begins. The hob as thus formed has the configuration of one half of a drill bit whose shank region is of circular cross-section.

FIG. 12 illustrates the manner in which the semi-cylindrical contour 80 is formed on the projections 78 and 79 of the hob 88. As can be seen in FIG. 12, a grinding wheel 90 is dressed to form a concave circular arc 92 at the corner formed between its flat front face 94 and its cylindrical outer surface 96. When the grinding wheel 90 is brought down upon and moved along the projections 78 and 79, the concave circular arc on the wheel periphery forms the upper surfaces of the projections 78 and 79 to cylindrical segments 97 (FIG. 12). As shown in FIG. 12, each cylindrical segment 97 extends over an arc of 90°. By making two passes over each of the projections 78 and 79 with the wheel 90 the upper surface of the projections may be ground to an arc of 180° thereby completing the semi-cylindrical upper surface contour 80. While FIG. 12 shows a grinding wheel dressed to a concave circular arc of 90° which is used to produce the semi-cylindrical upper surface contours in two operations, it will be readily appreciated that the same semi-cylindrical contour may be produced in a single grinding operation by use of a grinding wheel dressed to a concave circular arc of 180°.

The dressing of the grinding wheel 90 to form the circular arc 92 is illustrated in FIGS. 13 and 14. The grinding wheel is mounted (by conventional means not shown) to turn about a grinding wheel axis 98 in the direction of arrow A both during the dressing operation and during the grinding operation. The wheel 90 is dressed by causing a dressing stone 100, such as a diamond, to wear away the corner where the front and outer surfaces 94 and 96 of the grinding wheel 90 intersect. The dressing stone 100 is mounted on an arm 102, which extends up through a holder 104. The holder 104 in turn is mounted on the end of a support 106. The arm 102 is rotated about the axis 108 while the grinding wheel 90 is turned about its own axis 98 as shown by arrow B. This causes the dressing stone 100 to follow the concave circular arc 92 and thereby wear away the grinding wheel corner to the same contour. This contour can be made quite accurately and easily since only a single movement of the dressing stone 100 is required; that is, the only movement which the stone 100 must undergo is a rotational movement about the axis 108. No concurrent motion, either in translation or in rotation about any other axis, is required. Because of this, the dressing stone 108 may be very rigidly mounted so that a highly accurate and reproducible contour is formed on the grinding wheel 90.

After the hob 88 has been ground, as above described, to the configuration shown in FIG. 11, it is ready to be used in the manufacture of a pinch pointing die. The manner in which this takes place is illustrated in FIGS. 15-22. As shown in FIGS. 15 and 16, a pinch pointing die workpiece block 110, of generally rectangular configuration, is initially positioned above or adjacent to the hob 88, with a workpiece face 112 (FIG. 16) parallel to and facing the projections 78 and 79. The pinch point die workpiece block is then pressed down against the hob 88 as shown by arrows C so that the hob projections 78 and 79 push into the workpiece face 112 to form indentations 114 and 115 as shown in FIGS. 17 and 18. These indentations 114 and 115, of course, will have contours corresponding to the contours of the projections 78 and 79. It will be appreciated that the workpiece block 110 at this point is not hardened so that it can be shaped by the pressing action of the hob. It is preferable to provide a suitable lubricant along the surface of the workpiece block 110, to facilitate the flow of metal when the indentations 114 and 115 are formed.

It will be noted that only one hob projection, 78, is ground with a taper 84 and a flute forming notch 86, while the other projection, 79, has no taper or notch. Thus, only the projection 78 can form a die indentation of a shape suitable for drill point formation. Actually, the only purpose for the presence of the hob projection 79 is to balance the very high forces exerted between the hob and the die workpiece block so that the workpiece block will be maintained in proper orientation and alignment during the pressing or hobbing operation.

The cutting edge surface 87 of the flute forming notch 86, as shown in FIG. 16, passes through a horizontal line perpendicular to the semi-cylinder axis 44. In order to provide a rake angle the surface 87 is tilted slightly, preferably at an angle of about nine degrees from the cylindrical axis 44, as shown in FIG. 18. Also, in order to provide a drill screw flute cutting surface which intersects the periphery of the drill bit at the bi-arc intersection, the flute cutting surface 87 is positioned so that where the semi-cylindrical and tapered portions of the projection 78 meet, the surface 87 is at a finite distance above the axis 44. Preferably this distance is in the range of three to five percent of the radius of curvature of the semi-cylinder.

Figure 19:
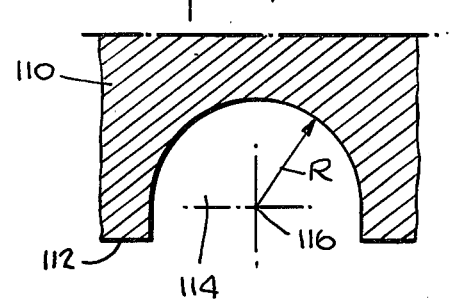
FIG. 19 is a fragmentary sectional view of a portion of the pinch pointing die blank as hobbed and corresponding to FIG. 17 but as removed from the hob.

After the pressing or hobbing operation has been completed, as above described, the now indented die workpiece block 110 is removed from the hob 88. As shown in FIGS. 19 and 20, the indentations 114 and 115 which had been formed by the hob projections 78 and 79 are semi-cylindrical in cross-section, with their common cylindrical axis 44 extending generally along and slightly inside the workpiece face 112. One of the indentations, i.e. 114, is also internally shaped with a taper 118 and an abutment 120 corresponding to the taper 84 and notch 86 of the hob projection 78. The semi-cylindrical cross-sectional portion of the indentation 114 constitutes a shank forming region while the tapered portion constitutes a flank forming region.

Figure 21:
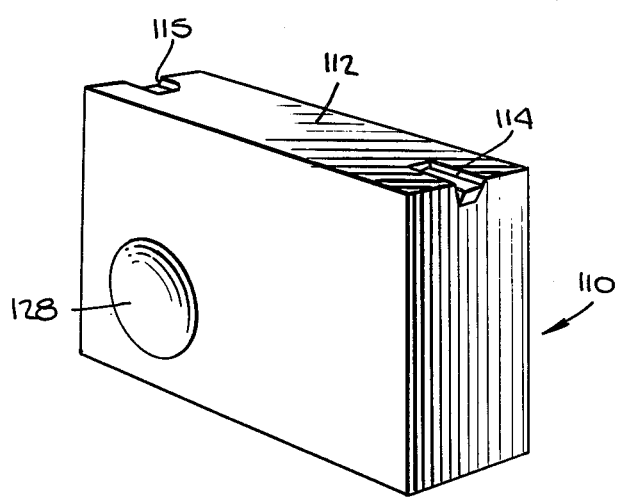
FIG. 21 is an overall perspective view of the pinch pointing die blank.
Figure 22:
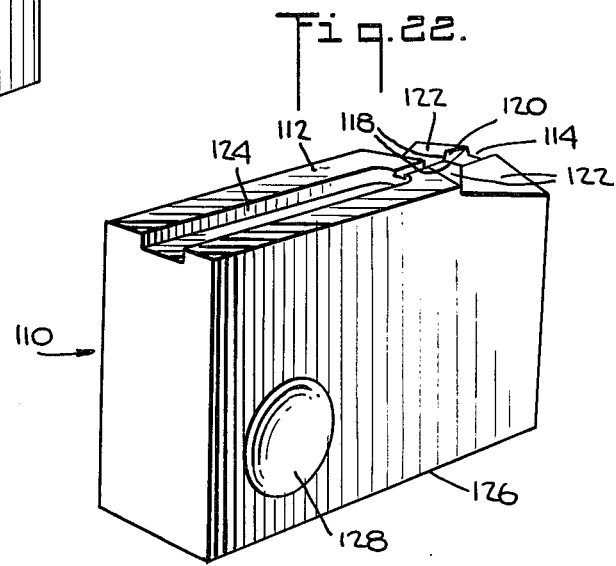
FIG. 22 is a perspective view of a fully ground pinch pointing die formed from the hobbed die blank of FIG. 21.

After the pinch point die workpiece block 110 has been formed with the indentations 114 and 115 as above described, the block is hardened and then ground. In the course of grinding the various outer surfaces of the block 110 are made flat and true with respect to each other so that these surfaces may be used for accurate location of the die. In addition, the workpiece face 112 is ground back, as shown in FIG. 21, so that the cylindrical axis 116 of the indentations 114 and 115 lie a slight distance s outside the block 110. That is the indentations 114 and 115 are actually less than semi-cylindrical after the grinding operation. The remaining portions of the workpiece face 112 are then ground back to provide various relief surfaces 122 around one of the indentations 114 as shown in FIG. 22. The other indentation 115 is simply obliterated by the grinding of a relief slot 124 extending centrally of the workpiece 112 away from the relief surfaces 122. Upon completion of this grinding there is thus formed a completed pinch point die 126. The pinch point die 126, as shown in FIG. 22, is also provided with a conical or concave indentation 128 on one surface thereof. This last mentioned indentation is engaged by a clamping screw (not shown) for holding the die tightly in position in a pinch pointing machine in which the die is used.

It will be appreciated that since the cylindrical axis 116 of the indentation 114 lies outside the die block 126, the curvature of the indentation follows that of a cylinder whose radius is greater than the depth of the indentation. In order to provide a drill bit with the above described preferred dimensional relationship the depth of each indentation 114 should be less than one half its width and more preferably it should be in the range of three to five percent less than one half its width. Most preferably it should be four percent less than one half its width. When a mating die of identical configuration is moved against the die 126, their respective cylindrical axes 116 will actually pass through each other; and when the dies meet, their indentations 114 cooperate to define the bi-arc configuration described in connection with FIG. 3.

The manner in which the pinch point die 126 is used to form a drill bit on the end of a drill screw blank is illustrated in FIGS. 23–25. As can be seen in FIG. 23, a pair of identical pinch pointing dies 126 are positioned with their workpiece faces 112 and indentations 114 facing each other. The dies 126 are mounted in a conventional pinch pointing machine (not shown) to move toward and away from each other as indicated by arrows D and E, FIGS. 23 and 24. A drill screw blank 130 is positioned between the dies 126 during this movement. As can be seen in FIG. 23, the drill screw blank 130 is an elongated, generally cylindrical metal element formed with a driving head 131 at one end. The manner in which these blanks are manufactured is well known; however, in general it may be said that they are cut from an elongated wire into discrete lengths. One end of each length is cold forged in a heading machine so that the metal is reshaped to a predetermined driving head configuration.

The drill screw blank 130 is held so that its longitudinal axis is perpendicular to the movement of the pinch pointing dies 126 and so that its end opposite the driving head 131 is in alignment with the indentations 114 of the dies 126. The dies 126 are then closed upon each other as shown in FIG. 24 to pinch the lower end of the drill screw blank 130 between their indentations 114. During this pinching operation the material of the drill screw blank 130 is reshaped, as can be seen in FIG. 25, to the contours of the indentations 114. Thus, the abutments 120 form the flutes 26 into the drill screw blank and the remaining curved portions of the indentations form corresponding curved lands on the periphery of the blank 130. The volume defined by the identations 114 is less than the volume occupied by the portion of the drill screw blank which is squeezed by these indentations and, accordingly, a certain amount of the metal of the blank is squeezed out between the adjacent relief surfaces 122 of the pinch pointing dies 126. This squeezed out metal remains on the blank in the form of flash 132 as shown in FIG. 25. After the pinch pointing dies 126 have completed their squeezing and reshaping operation they are pulled back away from each other and a pinch pointed drill screw blank 134 (FIG. 26) is removed from between the dies. It will be seen in FIG. 26 that the flash 132 remains attached by a very thin web 136 to the blank. This flash, which is later removed by bending, serves to protect the cutting edges along the still relatively soft drill point.

Because the two pinch pointing dies 126 are formed with indentations 114 which are somewhat less than semi-cylindrical, the cross-sectional configuration formed when the dies 126 are brought together is not a true circle but rather it is the bi-arc configuration described above in connection with FIGS. 1–8. Actually, during pinching movement of the dies 126 their cylindrical indentation axes 116, which are parallel, are caused to pass through each other. It will also be noted that the major axis a of the bi-arc cross section is perpendicular to the direction of die movement while the minor axis b is parallel to the direction of die movement. As pointed out previously, the bi-arc configuration which results from this die movement produces a drill screw bit having a reliefed surface behind the drill screw cutting edges; and it further provides a relatively sharp cutting edge forming angle. In addition, the bi-arc is utilized according to the present invention in a manner such that very accurate die forming hobs may be manufactured with a minimum of expense and difficulty; and the dies may be easily formed merely by pressing the cylindrical hob projections into the die surfaces and grinding the dies so that the cylindrical axis falls outside the die surface.

FIGS. 27–30 show the steps employed to complete the formation of the drill screw. As shown in FIG. 27, the drill screw blank 134 is positioned, in the usual manner, between a pair of roll thread dies 140 and 142. These dies have ridged thread forming surfaces 144 which face each other and which grip the blank and roll it along between them when the dies are moved along parallel paths in opposite directions to each other as illustrated by the arrows F. FIGS. 28 and 29 illustrate this rolling operation. As can be seen the ridges on the thread forming surfaces of the dies impress threads 146

(FIG. 29) into the drill screw blank 134. As thus far described the use of the dies 140 and 142 to form threads on the drill screw blank is conventional.

As shown in FIGS. 27-30 there is provided a recess 148 in each of the dies 140 and 142 just below their thread forming surfaces 144 toward the entering end of the die. This recess is large enough to accommodate the flash 132 on the drill screw blank 134 during the initial portion of the thread rolling operation so that the screw blank can rotate with the flash remaining intact. Each recess 148 terminates in a flash removal abutment surface 150 which curves forwardly out toward the thread forming surfaces 144. When the dies 140 and 142 have rolled the drill screw blank 134 to an extent such that its drill point end reaches the abutment surfaces 150, these surfaces become engaged by the flash 132 and as the screw blank continues to turn, the flash 132 is bent against the abutment surfaces 150 and snaps off to leave sharp cutting edges where the flutes 26 intersect the shank and flank portions 20 and 22.

The roll thread dies 140 and 142 are also provided with sizing surfaces 152 beyond the abutment surfaces 150. These sizing surfaces are parallel to the thread rolling surfaces 144 and they are positioned laterally with respect to the thread roll surfaces such that they engage the drill screw being formed in the region below the threads 146. The sizing surfaces remove any irregularities which may have resulted from the point forming and thread rolling operations; and they further serve to maintain the drill bit at a proper size and location with respect to the threads 146 so that the finished drill screw will drill a hole suitable for threading by its own threads. That is, the drill bit 16 should be coaxial with the threaded region of the drill screw and it should be sized to drill a hole at a diameter about half way between the root and crest diameter of the threads of the screw. This will allow the threads to form corresponding threads of nearly full size in the sides of the hole drilled by the drill screw.

After the thread rolling and flash removal operation is completed the now fully formed drill screw 10 is heat treated, in the usual manner, to provide a hardened case so that the screw will be capable of cutting into workpiece material when it is put into use.

Having thus described the invention with particular reference to the preferred forms thereof, it will be obvious to those skilled in the art to which the invention pertains that various changes and modifications may be made therein without departing from the spirit and scope of the invention as defined by the claims appended thereto.

What is claimed and desired to be secured by Letters Patent is:

1. A drill screw comprising an elongated element having a threaded central region, a driving head at one end of said element for receiving a turning and driving tool and a drill bit formation at the opposite end of said element for drilling a hole into which said element becomes threaded, said threaded central region, said driving head and said drill bit formation extending along a common longitudinal axis, said drill bit formation comprising a shank portion extending axially out from said opposite end of said element and a flank portion extending axially out from said shank portion, flute means formed in diagonally opposed quadrants of said shank and flank portions and extending longitudinally thereof, each of said flute means having a cutting edge surface and a drag edge surface which extend inwardly from the peripheral surfaces of said shank and flank portions to define diagonally opposed lands of circular cross-section interposed between said flutes, each said circular cross-section having a radius greater than the radius of said threaded central region, the intersection between the cutting edge surface of each flute with the peripheral surface of its associated shank and flank portion forming cutting edges, the center of curvature of each land cross-section along said shank portion being displaced from, but located along a line passing through, said longitudinal axis and extending transversely of another line between said edges, said cutting edges, at each cross-section of said drill bit formation, being located at a greater radial distance from said common longitudinal axis than any other point at said cross-section and the other periphery of the shank portion at each cross-section intersecting its associated cutting edge surface at an acute angle.

2. A drill screw construction according to claim 1 wherein the peripheral surface of each said flank portion intersects its associated cutting edge surface at an acute angle.

3. A drill screw according to claim 1 wherein the cutting edge surface of each flute means extends at a slight rake angle with respect to said common longitudinal axis.

4. A drill screw according to claim 3 wherein said cutting edge surface of each flute means crosses said common longitudinal axis where said shank and flank portions meet.

5. A drill screw according to claim 4 wherein the cutting edge surface of each flute means passes through a radial line extending perpendicularly from said common axis to said cutting edge wherein said shank and flank portions meet.

6. A drill screw according to claim 5 wherein said cutting edge surface extends at an angle of about nine degrees with respect to said common longitudinal axis.

7. A drill screw according to claim 1 wherein each said radius of curvature is in the range of from three to five percent greater than the distance from said common longitudinal axis to said cutting edge.

8. A drill screw according to claim 1 wherein said flank portion is characterized by a peripheral land surfaces which are essentially flat, along their length from each cutting edge and over the major portion of the distance to the next drag edge.

9. A drill screw according to claim 8 wherein the remaining peripheral land surface of each flank portion is curved to tangentially intersect said shank portion.

10. A drill screw according to claim 1 wherein the flank portion of each said flute extends into the drilling bit along the general direction of said line between said edges, but slightly offset therefrom, to a location beyond the common longitudinal axis to form a central web.

* * * * *